United States Patent
Pelegri-Llopart et al.

(10) Patent No.: US 7,278,132 B2
(45) Date of Patent: Oct. 2, 2007

(54) MECHANISM FOR AUTOMATIC SYNCHRONIZATION OF SCRIPTING VARIABLES

(75) Inventors: Eduardo Pelegri-Llopart, Menlo Park, CA (US); Laurence P. G. Cable, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 11/194,003

(22) Filed: Jul. 28, 2005

(65) Prior Publication Data

US 2005/0268225 A1    Dec. 1, 2005

Related U.S. Application Data

(63) Continuation of application No. 09/471,072, filed on Dec. 21, 1999, now Pat. No. 6,961,929.

(60) Provisional application No. 60/149,508, filed on Aug. 17, 1999, provisional application No. 60/141,071, filed on Jun. 25, 1999.

(51) Int. Cl.
*G06F 9/45* (2006.01)
*G06F 15/00* (2006.01)

(52) U.S. Cl. .................. 717/115; 717/136; 715/513

(58) Field of Classification Search ............ 717/115, 717/136
See application file for complete search history.

(56) References Cited

U.S. PATENT DOCUMENTS 5,781,908 A    7/1998    Williams et al.

OTHER PUBLICATIONS

"Getting Started with ColdFusion," [online] Oct. 2, 1998 [accessed Sep. 24, 2002], Allaire Corporation, part of "ColdFusion Documentation", Retrieved from Internet <URL:http://www.macromedia.com/v1/documents/cf4/dochome.htm>, pp. 1-5.*
"Developing Web Applications with ColdFusion," [online] Oct. 2, 1998 [accessed Sep. 24, 2002], Allaire Corporation, part of "ColdFusion Documentation", Retrieved from Internet <URL:http://www.macromedia.com/v1/documents/cf4/dochome.htm>, pp. 1-44.*
"Advanced ColdFusion Development," [online] Oct. 2, 1998 [accessed Sep. 24, 2002], Allaire Corporation, part of "ColdFusion Documentation", Retrieved from Internet <URL:http://www.macromedia.com/v1/documents/cf4/dochome.htm>, pp. 1-39.*

(Continued)

*Primary Examiner*—Tuan Dam
*Assistant Examiner*—Eric B. Kiss
(74) *Attorney, Agent, or Firm*—Dorsey & Whitney LLP

(57) ABSTRACT

The present invention defines a mechanism for automatic synchronization of scripting variables in an action tag extension facility. Attached to each action, there is a TagExtraInfo class that describes the action. The TagExtraInfo class knows the attributes of the class, including the names of the scripting variables introduced or modified by the action. At translation time, a tag handler accesses the information from the TagExtraInfo class for each tag in a page. At run time, a pageContext object is created containing a mapping of scripting variables to values. The values are visible to the scripting code, and the scripting code can modify the values. Also, the values are accessible by the action code. The action code can modify the values or create new values and assign the values to scripting variables so that the scripting code can modify them later. Thus, the present invention allows action tags to be created without explicit knowledge of the scripting language used to create a page.

20 Claims, 4 Drawing Sheets

OTHER PUBLICATIONS

"ColdFusion 4.0 Documentation Update," [online] Oct. 2, 1998 [accessed Sep. 24, 2002]. Allaire Corporation, part of "ColdFusion Documentation", Retrieved from Internet <URL:http://www.macromedia.com/v1/documents/cf4/dochome.htm>, pp. 1-4.*

"ColdFusion Quick Reference Guide," [online] Oct. 2, 1998 [accessed Sep. 24, 2002], Allaire Corporation, part of "ColdFusion Documentation", Retrieved from Internet <URL:http://www.macromedia.com/v1/documents/cf4/dochome.htm>, pp. i-iv, 1-30.*

"JavaServer Pages Specification—Draft," 1998 [accessed Oct. 16, 2006], Sun Mircosystems, Inc., Retrieved from Internet <URL:http://www.kirkdorffer.com/jspspecs/jsp091.html>, 17 pages.*

Kuwabara et al., "AgenTalk: Describing Multiagent Coordination Protocols with Inheritance," 1995 IEEE.

Bussmann, "Agent-Oriented Programming of Manufacturing Control Tasks," 1998 IEEE.

International Search Report dated Apr. 22, 2005 regarding International Application No. EP 00 30 5293.

* cited by examiner

MECHANISM FOR AUTOMATIC SYNCHRONIZATION OF SCRIPTING VARIABLES

CROSS REFERENCE TO RELATED APPLICATION

This application is a continuation of U.S. patent application entitled "MECHANISM FOR AUTOMATIC SYNCHRONIZATION OF SCRIPTING VARIABLES", by Pelegri-Llopart et al., filed on Dec. 21, 1999 now U.S. Pat. No. 6,961,929 (U.S. application Ser. No. 09/471,072) which claims the benefit of U.S. Provisional Application No. 60/141,071, filed on Jun. 25, 1999, entitled "JAVA SERVER PAGES SPECIFICATION," and of U.S. Provisional Application No. 60/149,508, filed on Aug. 17, 1999, entitled "JAVASERVER PAGES SPECIFICATION," and is related to U.S. patent application Ser. No. 09/467,387, filed on Dec. 21, 1999, entitled "MULTI-LINGUAL TAG EXTENSION MECHANISM." The applications are commonly assigned to the assignee of the present invention, and the disclosures of which are herein incorporated by reference.

BACKGROUND OF THE INVENTION

The present invention relates generally to the field of computer software, and more particularly to a mechanism for automatic synchronization of scripting variables in a tag extension facility suitable for JAVASERVER™ Pages.

The JAVA™ programming language is expressly designed for use in the distributed environment of the Internet. It is designed to have the "look and feel" of the C++ programming language, but it is simpler to use than C++ and enforces an object-oriented programming model. The JAVA™ programming language can be used to create complete applications that can run on a single computer or be distributed among servers and clients in a network. The JAVA™ programming language can also be used to build a small application module or applet for use as part of a webpage. Applets make it possible for a Web page user to interact with the page. JAVASERVER™ Pages is the JAVA™ programming language platform technology (hereinafter JAVA platform) for building applications containing dynamic Web content such as HTML, DHTML, XHTML, and XML. A JAVASERVER™ Page (JSP) is a text-based document that describes how to process a request to create a response. The description inter-mixes template data with some dynamic actions, taking advantage of the capabilities of the JAVA™ programming language platform. The template data is commonly fragments of a structured document (HTML, DHTML, XHTML or XML), and the dynamic actions can be described with scripting elements and/or server-side actiontags.

A simple example of a JSP page is shown in FIG. 2. The example shows the response page, which is intended to be a short list of the day of the month and year, at the moment the request is received by the server. The page itself contains some fixed template text, and JSP elements that are shown underlined in the figure. The underlined actions are executed on the server side. When a client makes a request, such as an HTTP request, a request object requests a response from the JAVASERVER™ container object. The first element creates a JAVA™ Bean component named clock, of type calendar.jspCalendar. The next two elements use the JAVA Bean component to display some of its properties (i.e. month and year). The output is sent to a response object which sends a response back to the client.

A JSP page is executed by a JSP container, which is installed on a Web server, or on a Web enabled application server. The JSP container delivers requests from a client to a JSP page and responses from the JSP page to the client. JSP pages may be implemented using a JSP translation or compilation phase that is performed only once, followed by a request processing phase that is performed once per request. The translation phase creates a JSP page implementation class that implements a servlet interface.

Typically, a JSP page contains declarations, fixed template data, action instances that may be nested, and scripting elements. When a request is delivered to a JSP page, all these components are used to create a response object that is then returned to the client. As with standard Web pages, JSP pages may contain "tags." A tag is a textual element within a document that provides instructions for formatting or other actions. For example, World Wide Web documents are set up using HTML (Hyper-Text Mark-up Language) tags which serve various functions such as controlling the styling of text and placement of graphic elements, and also providing links to interactive programs and scripts.

In standard implementations, a JSP page is translated into JAVA™ programming language code (hereinafter JAVA™ code) that runs on a server. The transformation from the JSP page into JAVA™ code is done once, when the page is first accessed. The JAVA™ code running on the server is activated when a request is received. In order to create a response object, certain data is passed verbatim to the response, and some actions are executed on the server side. Some of these actions are explicitly spelled out in the JSP page, and other actions are described by the semantics of the text. Thus, there are three types of code: verbatim code, scripting code from the JSP page, and code which has to be defined by the tag library. As used herein, "tags" in the JSP context will be referred to as "actions."

Ideally, a tag mechanism employed in a JSP page system would allow for actions to be defined in standard libraries. This would allow third parties to provide new actions as part of their JSP authoring tools. For example, as shown in FIG. 3, a JSP page author may use a JSP specification-compliant authoring tool to create a Web page. The vendor of the authoring tool can provide new actions via a JSP tag library, such as a tag library that supports chat room functionality. The page can then be deployed into any JSP-compliant container, such as a Web browser. The Web browser uses the same tag library information in order to run the Web page, including the desired chat room functions.

In other words, if a standard JSP tag mechanism is properly defined, vendors of tag libraries can use the standard specification to create tag libraries that are compliant with the JSP environment. Also, vendors of authoring tools can create authoring tools (and scripting languages) compliant with the specification, and vendors of Web browsers can create JSP compliant Web browsers. A Web page author can then choose the best tag library and the best authoring tool available for creating the desired Web pages. Two different Web browsers may support scripting in a completely different manner, but the same tag libraries must be supported by both in order to run the Web page. In a JSP page, there are objects that are created at execution time, which can be associated with variables in the scripting language. The tag extensions can be invoked from the main JSP page and may update the objects, or create new ones. When creating a new object, the tag extension may need to provide the new object to the JSP page, and associate the object with a scripting variable. However, the tag extensions and the scripting page may be defined in different languages.

Thus, there is a need to define a mechanism such that the scripting variables can be passed between the JSP container and the tag extension mechanism and updated automatically (i.e. the variables can be synchronized).

Certain prior extension mechanisms rely on explicit manipulation of the variable to object mapping (i.e. a context). This context is available to both the extension mechanism and to the scripting elements in the JSP page, either directly in the language or through explicit method calls. Other extension mechanisms are mono-lingual and assume that the context is known to both the extension mechanism and the scripting elements in the JSP page. Both approaches are too restrictive, however. Preferably, an implementation would provide greater flexibility for allowing different, compatible scripting languages to work with the tag extension mechanism.

SUMMARY OF THE INVENTION

The present invention defines a mechanism for automatic synchronization of scripting variables in an action tag extension facility. This allows custom actions to create and modify variables, while still allowing the variables to be visible to the scripting language. The values are visible to the scripting code, and the scripting code can modify the values. Also, the values are accessible by the action code. The action code can modify the values or create new values and assign the values to scripting variables so that the scripting code can modify them later.

Attached to each action, there is a TagExtraInfo class that describes the action. The TagExtraInfo method will return at translation time an array of objects that describe the run-time effect of the action. Each object contains a name of each variable as a valid JAVA™ programming language object (hereinafter JAVA™ object), a JAVA™ programming language type (hereinafter JAVA™ type) of each variable, and a scope parameter which defines a variable's scope with the page and indicates whether the variable is new or pre-existing. At translation-time, the JSP page is translated into a servlet class. In the process of translation, the translator asks for the list of scripting variables from TagExtraInfo object for a given action. If a new variable has been defined, the translator may need to provide a new declaration statement. At run time, the action tag handler references a pageContext object, which provides key values for specified variable names. The pageContext object points to an object associated with a given variable name and is created when the page is executed, thereby associating a variable with a value.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The following description is provided to enable any person skilled in the art to make and use the invention and sets forth the best modes contemplated by the inventor for carrying out the invention. Various modifications, however, will remain readily apparent to those skilled in the art, since the basic principles of the present invention have been defined herein specifically to provide a mechanism for automatic synchronization of scripting variables in a tag extension facility for JAVASERVER™ Pages.

The present invention employs various computer-implemented operations involving data stored in computer systems. These operations include, but are not limited to, those requiring physical manipulation of physical quantities. Usually, though not necessarily, these quantities take the form of electrical or magnetic signals capable of being stored, transferred, combined, compared, and otherwise manipulated. The operations described herein that form part of the invention are useful machine operations. The manipulations performed are often referred to in terms, such as, producing, identifying, running, determining, comparing, executing, downloading, or detecting. It is sometimes convenient, principally for reasons of common usage, to refer to these electrical or magnetic signals as bits, values, elements, variables, characters, data, or the like. It should remembered, however, that all of these and similar terms are to be associated with the appropriate physical quantities and are merely convenient labels applied to these quantities.

The present invention also relates to a device, system or apparatus for performing the aforementioned operations. The system may be specially constructed for the required purposes, or it may be a general purpose computer selectively activated or configured by a computer program stored in the computer. The processes presented above are not inherently related to any particular computer or other computing apparatus. In particular, various general-purpose computers may be used with programs written in accordance with the teachings herein, or, alternatively, it may be more convenient to construct a more specialized computer system to perform the required operations.

Figure 1:
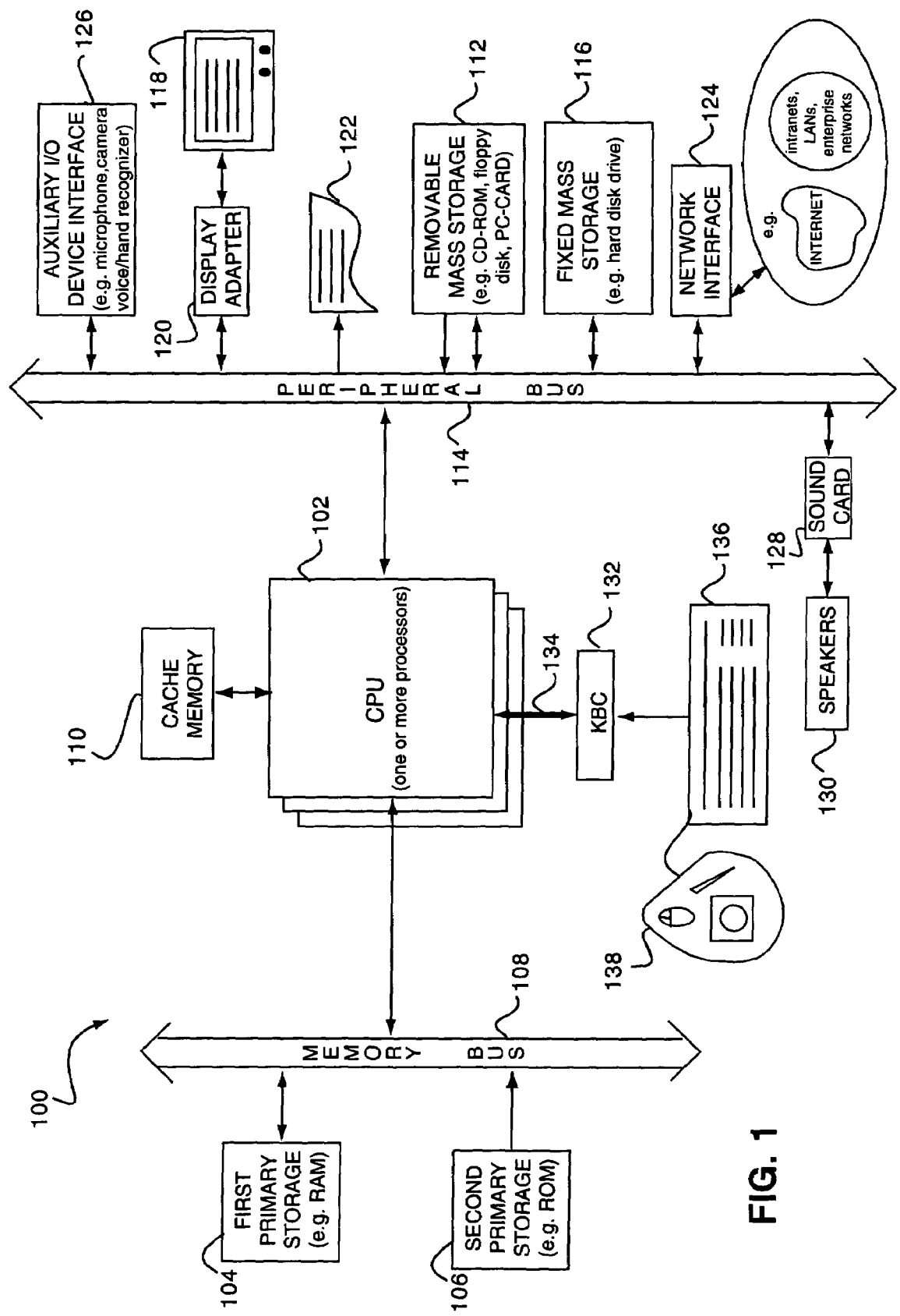
FIG. 1 is a block diagram of a computer system suitable for implementing the present invention.
Figure 2:
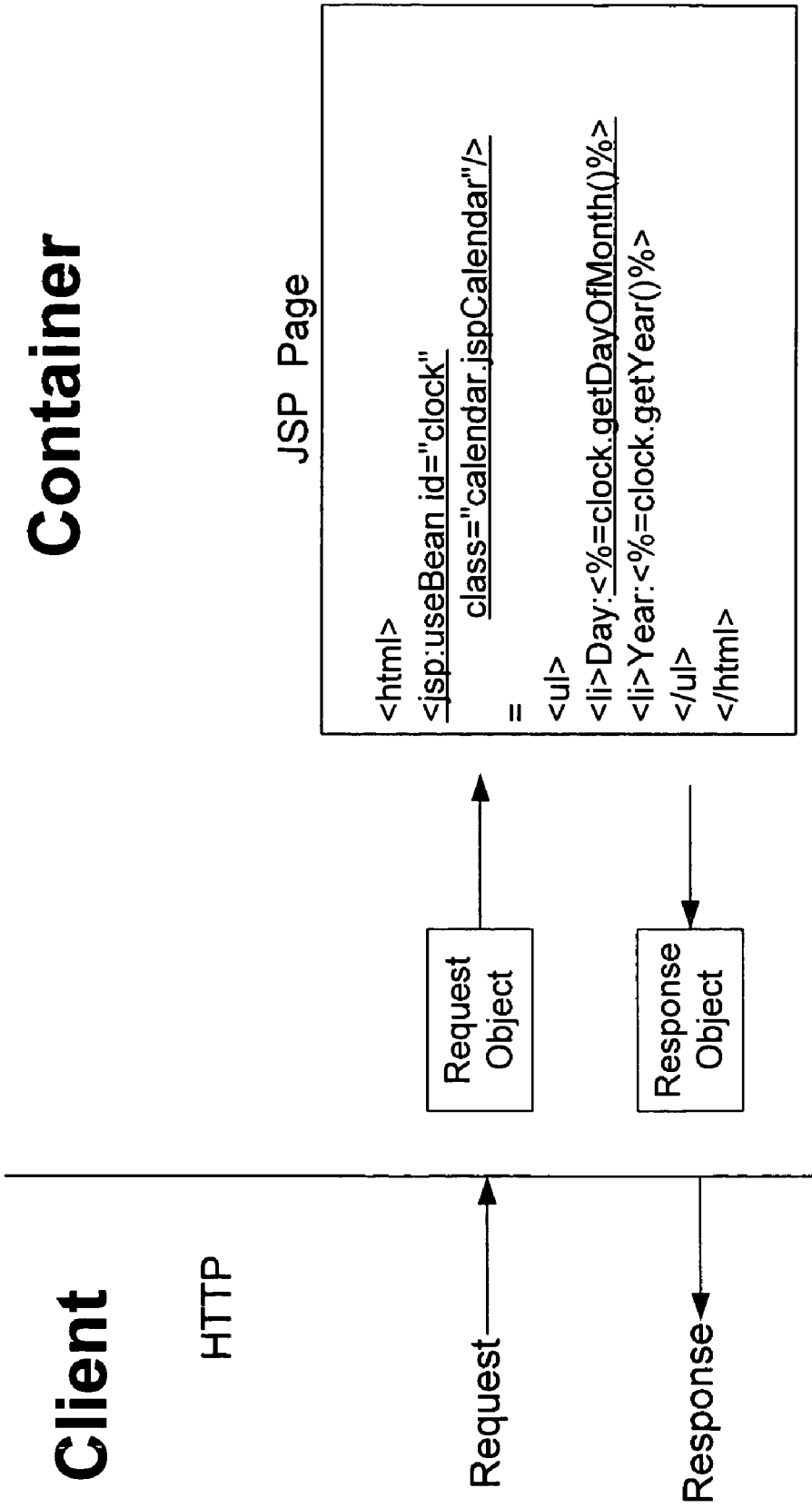
FIG. 2 illustrates a JSP page.
Figure 3:
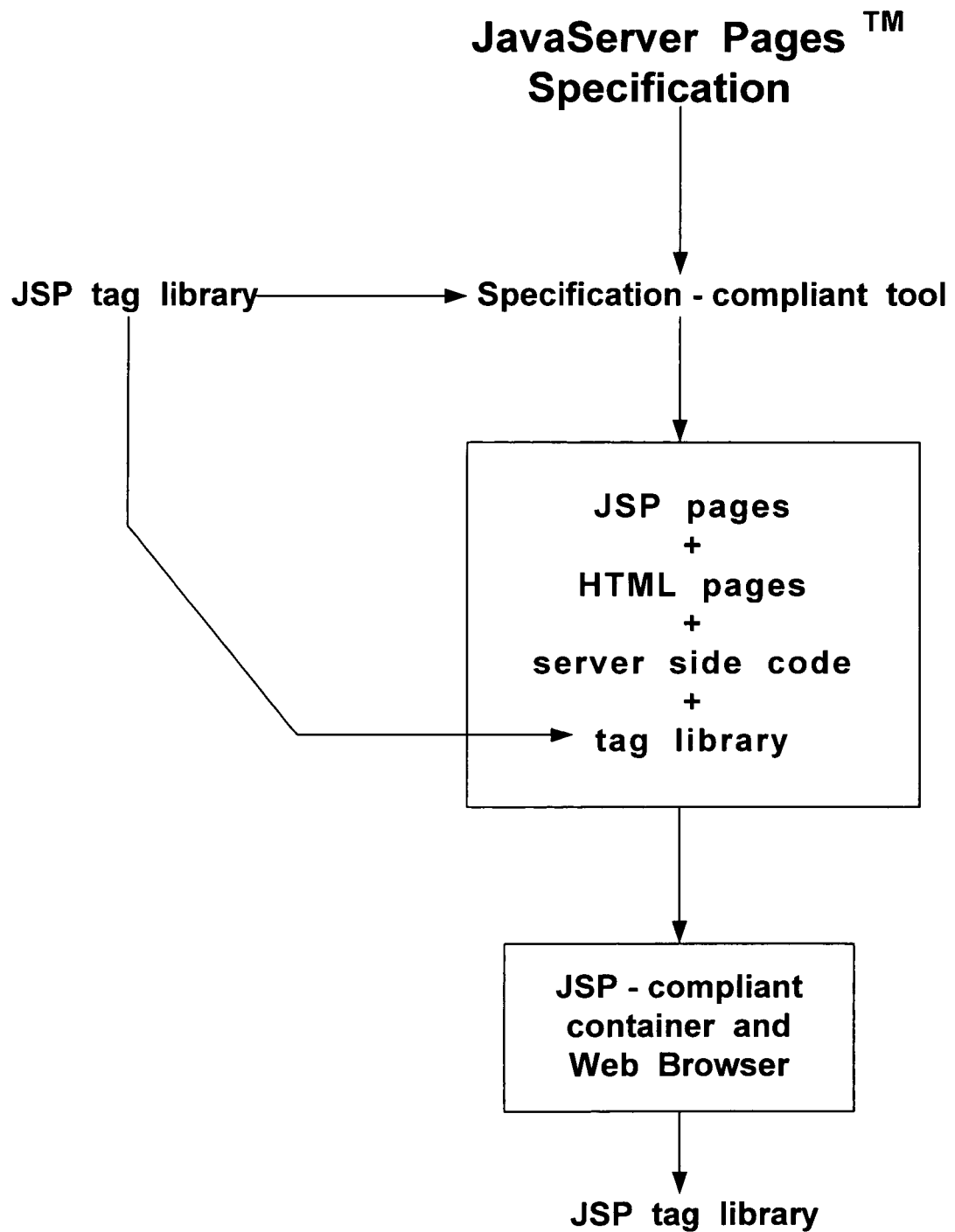
FIG. 3 is a diagram illustrating the relationship between a tag library, a JSP page, and a Web browser.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. It should be noted that in re-configurable computing systems, CPU 102 can be distributed amongst a group of programmable logic devices. In such a system, the programmable logic devices can be reconfigured as needed to control the operation of computer system 100. In this way, the manipulation of input data is distributed amongst the group of programmable logic devices. CPU 102 is a general purpose digital processor which controls the operation of the computer system 100. Using instructions retrieved from memory, the CPU 102 controls the reception and manipulation of input data, and the output and display of data on output devices.

CPU 102 is coupled bi-directionally with a first primary storage 104, typically a random access memory (RAM), and uni-directionally with a second primary storage area 106, typically a read-only memory (ROM), via a memory bus 108. As is well known in the art, primary storage 104 can be used as a general storage area and as scratch-pad memory, and can also be used to store input data and processed data. It can also store programming instructions and data, in the form of data objects, in addition to other data and instructions for processes operating on CPU 102, and is used typically used for fast transfer of data and instructions in a bi-directional manner over the memory bus 108. Also as well known in the art, primary storage 106 typically includes basic operating instructions, program code, data and objects used by the CPU 102 to perform its functions. Primary storage devices 104 and 106 may include any suitable computer-readable storage media, described below, depending on whether, for example, data access needs to be bi-directional or uni-directional. CPU 102 can also directly and very rapidly retrieve and store frequently needed data in a cache memory 110.

A removable mass storage device 112 provides additional data storage capacity for the computer system 100, and is coupled either bi-directionally or uni-directionally to CPU 102 via a peripheral bus 114. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 116 also provides additional data storage capacity and is coupled bi-directionally to CPU 102 via peripheral bus 114. The most common example of mass storage 116 is a hard disk drive. Generally, access to these media is slower than access to primary storages 104 and 106.

Mass storage 112 and 116 generally store additional programming instructions, data, and the like that typically are not in active use by the CPU 102. It will be appreciated that the information retained within mass storage 112 and 116 may be incorporated, if needed, in standard fashion as part of primary storage 104 (e.g. RAM) as virtual memory.

In addition to providing CPU 102 access to storage subsystems, the peripheral bus 114 is used to provide access other subsystems and devices as well. In the described embodiment, these include a display monitor 118 and adapter 120, a printer device 122, a network interface 124, an auxiliary input/output device interface 126, a sound card 128 and speakers 130, and other subsystems as needed.

The network interface 124 allows CPU 102 to be coupled to another computer, computer network, or telecommunications network using a network connection as shown. Through the network interface 124, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 124.

Auxiliary I/O device interface 126 represents general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

Also coupled to the CPU 102 is a keyboard controller 132 via a local bus 134 for receiving input from a keyboard 136 or a pointer device 138, and sending decoded symbols from the keyboard 136 or pointer device 138 to the CPU 102. The pointer device may be a mouse, stylus, track ball, or tablet, and is useful for interacting with a graphical user interface.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

It will be appreciated by those skilled in the art that the above described hardware and software elements are of standard design and construction. Other computer systems suitable for use with the invention may include additional or fewer subsystems. In addition, memory bus 108, peripheral bus 114, and local bus 134 are illustrative of any interconnection scheme serving to link the subsystems. For example, a local bus could be used to connect the CPU to fixed mass storage 116 and display adapter 120. The computer system shown in FIG. 1 is but an example of a computer system suitable for use with the invention. Other computer architectures having different configurations of subsystems may also be utilized.

As the term is used herein, a tag extension mechanism is a specialized sub-language that enables the addition of new or custom actions, thus allowing the JSP "language" to be easily extended in a portable fashion. A typical example would be elements to support embedded database queries. Tag libraries can be used by JSP authors or JSP authoring tools and can be distributed along with JSP pages to any JSP container (i.e. JSP environment and/or engine), such as Web and application servers. The tag extension mechanism of the present invention can be used from JSP pages written using any valid scripting language, although the mechanism itself only assumes a JAVA™ programming language RunTime environment.

Figure 4:
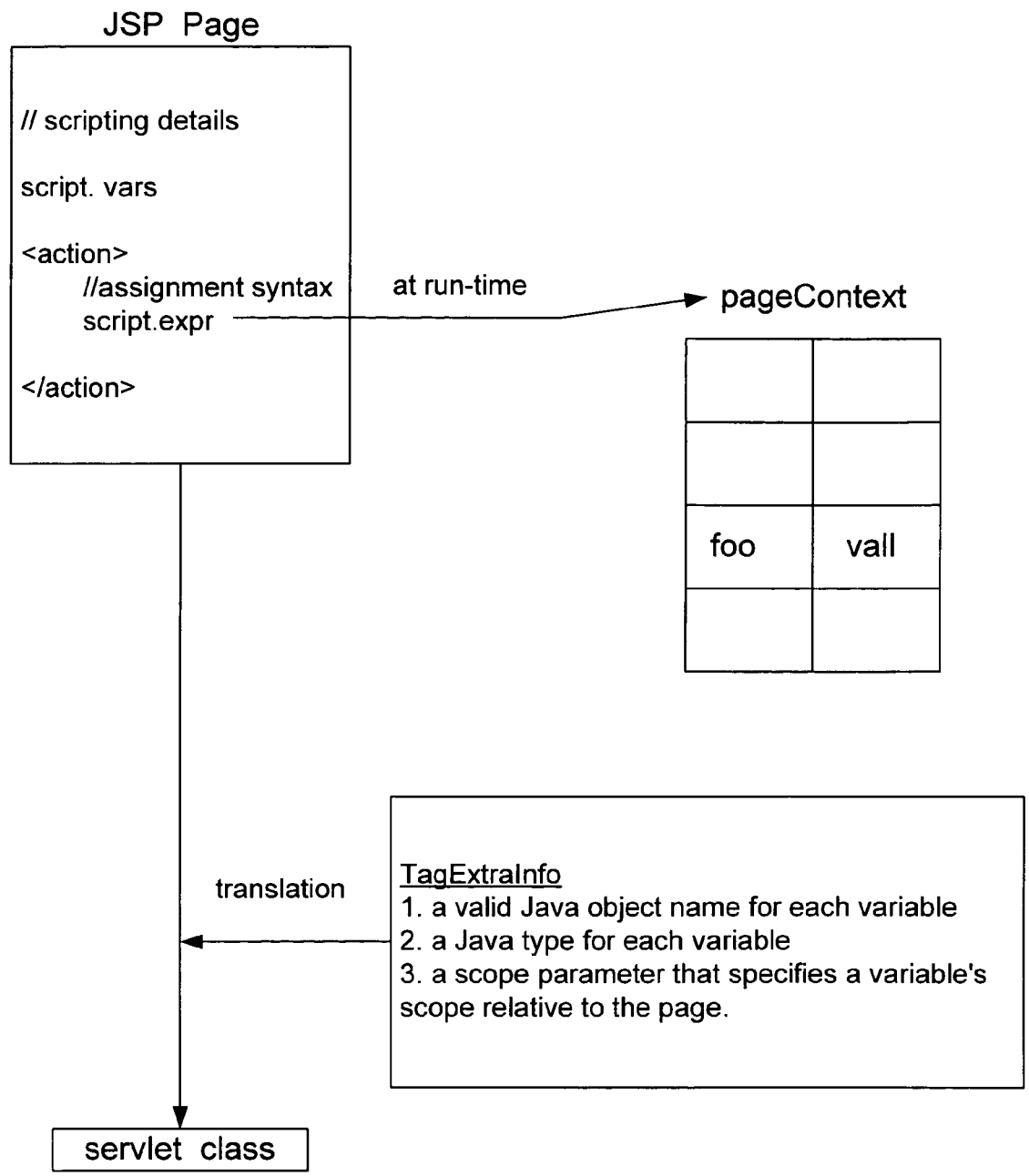
FIG. 4 is a block diagram illustrating the components of the present invention.

As shown in FIG. 4, a JSP page, many contain scripting variables and actions (tags). These actions or tags can define new scripting variables or update existing variables. The present invention defines a mechanism that allows the actions to create and modify objects, while still allowing the objects to be visible to the scripting language. The values are visible to the scripting code, and the scripting code can modify the values. Also, the values are accessible by the action code. The action code can modify the values or create new values and assign the values to scripting variables so that the scripting code can modify them later.

A tag library constructed according to the present invention is a collection of available action tags. A tag library includes a tag library descriptor (TLD). For each tag, the tag library descriptor includes a tag handler class (i.e. a request time object of the tag), and an optional TagExtrainfo class. Thus, attached to each action, there is a TagExtraInfo class that describes the action. The TagExtraInfo class knows the attributes of the class, including the names of the scripting variables introduced or modified by the action. In other words, the TagExtraInfo class maintains a list of variables defined or changed in an action. More specifically, the TagExtraInfo method will return at translation time an array of objects that describe the run-time effect of the action. Each object contains a name of each variable as a valid JAVA™ object, a JAVA™ type of each variable, and a scope parameter which defines a variable's scope with the page and indicates whether the variable is new or pre-existing.

At translation-time, the JSP page is translated into a servlet class. In the process of translation, the translator asks for the list of scripting variables from TagExtraInfo object for a given action. If a new variable has been defined, the translator may need to provide a new declaration statement. At run time, the action tag handler references a pageContext object, which provides key values for specified variable names. The pageContext object points to an object associated with a given variable name and is created when the page is executed, thereby associating a variable with a value.

The scripting details of the JSP page are only known by the translator, and the translator is the only component that knows how to define new scripting variables and how to assign them. The translator generates code that will access the page context object, according to some contract. The contract is described by a combination of specification-defined conventions plus the information provided by the TagExtraInfo object. At run time, the code generated by the translator will look for the name of a variable (i.e. "foo") and assign its value to the scripting variable.

As described above, the JSP container (translator) knows the details of the scripting language of the page, whereas the author of the action tag is unaware of which scripting language will be used. So in order to provide for maximum flexibility and portability, the present invention provides a mechanism that insulates the tag implementation (tag mechanism) from the scripting language details. If both the tag library and the scripting page were written in the same language, such as the JAVA™ programming language, the variables could be synchronized more easily. However, in order to provide a more general solution, the present invention exposes the variables in an action tag at translation time via the TagExtraInfo class, and uses a pageContext object to map the variables to values at run time.

Thus, by having a description of the names and types of the scripting variables provided by the tag library, the JSP container is not limited to any particular scripting language or specific scripting language implementation. The key idea is to combine an explicit run-time representation of the context with the translation-time information of the scripting variables affected. The tag extension uses the run-time context to modify and/or create objects. The main JSP page uses the translation-time information to automatically synchronize the scripting variables whenever the main JSP page code is accessed. In other words, the TagExtraInfo object knows which variables are going to be modified, and the scripting language knows how to do the modification. By providing a mechanism for the tag library and the JSP container to share this information, the present invention facilitates the use of many different scripting languages for JSP pages and provides the addition of many new action tags from various vendors.

In one embodiment, the JSP page implementation instantiates (or reuses) a tag handler object for each action in the JSP page. This handler object is a JAVA™ object that implements the javax.servlet.jsp.tagext.Tag interface. The tag handler then passes in the values for the variables to a pageContext object. The pageContext object encapsulates implementation dependent features and provides convenience methods, such as getter methods to obtain references to various request-time objects. The pageContext object also provides access to all the implicit objects (including the request object, for instance) to the handler.

When a custom tag introduces some new identifiers, a javax.servlet.jsp.tagext.TagExtraInfo object is involved at JSP translation time (not at request-time). This object indicates the names and types of the scripting variables that will be assigned objects (at request time) by the action. The only responsibility of the tag author is to indicate this information in the TagExtraInfo object. The corresponding Tag object must add the objects to the pagecontext object. It is the responsibility of the JSP translator to automatically supply all the required code to do the "synchronization" between the pageObject values and the scripting variables.

An action tag can define one or more objects, and an id attribute may be used to describe the "main" object (if any) defined by the tag. The scope attribute can be used to describe where to introduce the object. The pageContext interface is used to access and modify the scope data.

In a tag of the form:

```
<foo attr="one" attr2="two">
    body
</foo>
```

The action foo may define some scripting variables that are available within a body, and it may also define some scripting variables that are defined after the end of the action tag. The defined variables are inserted into the pageContext object and are available through the pageContext object to the code that implements other tags.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

The invention claimed is:

1. A computer system having at least one processor for automatic synchronization of scripting variables between a page including action tags and a tag library, the computer system comprising:

a page containing instructions for creating an application with dynamic content, the page including one or more action tags defining actions for the page;

a tag library including a collection of action tags and an associated object for each action tag, the associated object including a method that returns a list of scripting variables that are defined or modified by the action tag;

a translator operable to:

translate the action tags on the page into an executable programming code that can be executed at runtime to perform the actions intended by the action tags, wherein the translation includes calling the method in the associated object for each action tag, thereby allowing each of the scripting variables affected by the action tags to be assigned appropriate runtime values when the executable programming code is executed at runtime;

a page context object for the page, the page context object including a mapping of at least one scripting variable to a runtime value that can be represented in the tag library; and a synchronizer to provide a synchronization of the list of scripting variables.

2. The computer system of claim 1, wherein the method in the associated object also returns a variable type and scope associated with each scripting variable that is defined or modified by the action tag.

3. The computer system of claim 1, wherein the page context object is created at runtime when the page is executed.

4. The computer system of claim 1, further comprising a tag handler operable to:

generate, at runtime, one or more objects that the page requires; and store the generated one or more objects into the page context object, thereby allowing the generated one or more objects to be retrieved at runtime when the executable code is executed, the one or more objects being assigned at runtime to each of the scripting variables in the list of scripting variables that is returned by the method in the associated object at translation time.

5. The computer system of claim 1, wherein the associated object includes:

a valid object name for each scripting variable;

a type for each scripting variable; and a scope parameter that specifies a scripting variable's scope relative to the page.

6. The computer system of claim 1, wherein the page is executed on a server that implements a container, and the page is converted to a platform independent code that is executed on the server.

7. A machine-readable medium for automatic synchronization of scripting variables between a page including action tags and a tag library, the page containing instructions for creating an application with dynamic content, having sets of instructions stored thereon which, when executed by a machine, cause the machine to:

instantiate, by a translator at translation time, for each action tag an associated object, wherein the associated object includes a method that returns a list of scripting variables that can be defined or modified by an associated action tag;

invoke the method by the translator at translation time;

receive, in response to the invocation of the method, one or more associated objects, wherein each of the returned associated objects includes an available scripting variable; generating, by the translator and based on the returned associated objects, executable code to be executed at runtime, wherein the executable code is operable to access data stored in a page context object, and wherein the data stored in the page context object includes appropriate runtime values for each available scripting variable; and execute, at runtime, the code generated by the translator in order to assign appropriate runtime values from the page context object to each available scripting variable; and provide a synchronization of the list of scripting variables.

8. The machine-readable medium of claim 7, wherein the sets of instructions which, when executed by the machine, further cause the machine to:

receive, in response to the invocation of the method, a variable type and scope associated with each scripting variable that is defined or modified by the associated action tag.

9. The machine-readable medium of claim 7, wherein the sets of instructions which, when executed by the machine, further cause the machine to:

create the page context object at runtime when the page is executed.

10. The machine-readable medium claim 7, wherein the sets of instructions which, when executed by the machine, further cause the machine to:

generate, by a tag handler and at runtime, one or more objects that the page requires; and store, by the tag handler, the generated one or more objects into the page context object, thereby allowing the generated one or more objects to be retrieved at runtime when the executable code is executed, the one or more objects being assigned at runtime to each of the scripting variables in the list of scripting variables that is returned by the method in the associated object at translation time.

11. The machine-readable medium of claim 7, wherein the associated object includes:

a valid object name for each scripting variable;

a type for each scripting variable; and a scope parameter that specifies a scripting variable's scope relative to the page.

12. The machine-readable medium of claim 7, wherein the sets of instructions for the executing which, when executed by the machine. further cause the machine to:

convert the page to platform independent code; and execute the page on a server that implements a container.

13. The machine-readable medium of claim 7, wherein the page is written in a first programming code that is different from a second programming code that is used to implement the tag library.

14. A computer program product, stored on a machine-readable medium, for automatic synchronization of scripting variables between a page including action tags and a tag library, having stored thereon sets of instructions which, when executed by a machine, cause the machine to:

generate a page containing instructions for creating an application with dynamic content, the page including one or more action tags defining actions for the page;

generate a tag library including a collection of action tags and an associated object for each action tag, the associated object including a method that returns a list of scripting variables that are defined or modified by the action tag;

translate the action tags on the page into an executable programming code that can be executed at runtime to perform the actions intended by the action tags, wherein the translation includes calling the method in the associated object for each action tag, thereby allowing each of the scripting variables affected by the action tags to be assigned appropriate runtime values when the executable programming code is executed at runtime;

generate a page context object for the page, the page context object including a mapping of at least one scripting variable to a runtime value that can be represented in the tag library; and provide a synchronization of the list of scripting variables.

15. The machine-readable medium of claim 14, wherein the method in the associated object also returns a variable type and scope associated with each scripting variable that is defined or modified by the action tag.

16. The machine-readable medium of claim 14, wherein the sets of instructions which, when executed by the machine. further cause the machine to create the page context object at runtime when the page is executed.

17. The machine-readable medium of claim 14, wherein the sets of instructions which, when executed by the machine. further cause the machine to:

generate, at runtime, one or more objects that the page requires; and store the generated one or more objects into the page context object, thereby allowing the generated one or more objects to be retrieved at runtime when the executable code is executed, the one or more objects being assigned at runtime to each of the scripting variables in the list of scripting variables that is returned by the method in the associated object at translation time.

18. The machine-readable medium of claim 14, wherein the associated object includes:

a valid object name for each scripting variable;

a type for each scripting variable; and a scope parameter that specifies a scripting variable's scope relative to the page.

19. The machine-readable medium of claim 14, wherein the sets of instructions which, when executed by the machine, further cause the machine to:

execute the page on a server that implements a container; and convert the page to a platform independent code that is executed on the server.

20. The machine-readable medium of claim 14, wherein the page is written in a first programming code that is different from a second programming code that is used to implement the tag library.

* * * * *

UNITED STATES PATENT AND TRADEMARK OFFICE
CERTIFICATE OF CORRECTION

PATENT NO. : 7,278,132 B2 Page 1 of 1
APPLICATION NO. : 11/194003
DATED : October 2, 2007
INVENTOR(S) : Eduardo Pelegri-Llopart and Laurence P.G. Cable It is certified that error appears in the above-identified patent and that said Letters Patent is hereby corrected as shown below:

Column 10, at line 45, delete "." and insert --,--.

Column 10, at line 52, delete "computer-program product, stored on a".

Column 11, at line 17, delete "." and insert --,--.

Column 11, at line 21, delete "." and insert --,--.

Signed and Sealed this

Eighteenth Day of December, 2007

JON W. DUDAS
*Director of the United States Patent and Trademark Office*